United States Patent [19]

Sakakibara et al.

[11] Patent Number: 4,561,606
[45] Date of Patent: Dec. 31, 1985

[54] SEAT BELT RETRACTOR OF AUTOMOBILE

[75] Inventors: Kazuo Sakakibara, Toyokawa; Toshiaki Shimogawa; Masahiko Kato, both of Okazaki; Fumio Matsuoka, Toyota, all of Japan

[73] Assignees: Nippon Soken, Inc., Nishio; Toyota Jidosha Kabushiki Kaisha, Toyota, both of Japan

[21] Appl. No.: 543,458

[22] Filed: Oct. 19, 1983

[30] Foreign Application Priority Data

Oct. 21, 1982 [JP] Japan .................. 57-183679

[51] Int. Cl.⁴ .................. A62B 35/02; B65H 75/48
[52] U.S. Cl. .................. 242/107
[58] Field of Search .......... 242/107, 107.4 R–107.4 E; 280/806; 297/474–478, 480

[56] References Cited

U.S. PATENT DOCUMENTS

| 4,372,501 | 2/1983 | Inukai | 242/107 |
| 4,447,017 | 5/1984 | Inukai | 242/107.4 A |
| 4,471,918 | 9/1984 | Ando | 242/107 |

FOREIGN PATENT DOCUMENTS 58-67462  5/1983  Japan .
58-67461  5/1983  Japan .

Primary Examiner—John M. Jillions
Attorney, Agent, or Firm—Cushman, Darby & Cushman

[57] ABSTRACT

A seat belt retractor, a reel of which is rotated by a winding spring and a tightening spring when shock is applied on the automobile body. The winding spring is provided to a reel which winds a seat belt, while the tightening spring is provided to a shaft. In a normal condition, the reel is separated from the shaft by a clutch. Resilient force of the tightening spring is stored to the shaft by a stopper. In a normal condition, the seat belt is retracted only by the winding spring. When shock is applied on the automobile body, the stopper releases the shaft, which rotates by the tightening spring. Then, the clutch connects the shaft and the reel, whereby the seat belt is retracted by the winding spring and the tightening spring.

3 Claims, 14 Drawing Figures

SEAT BELT RETRACTOR OF AUTOMOBILE

BACKGROUND OF THE INVENTION

1. Field of the Invention

This invention relates to a seat belt retractor which tightens a seat belt when an automobile body undergoes acceleration or deceleration exceeding a predetermined value, so that the seat belt secures a passenger to a seat.

2. Description of the Prior Art

A previously known seat belt retractor comprises a reel rotatably supported in a housing and winding a seat belt. A winding spring urges the reel in the direction in which the seat belt is wound. A tightening spring is directly connected to the winding spring. A lock mechanism is provided between the tightening spring and the winding spring so as to stop transmission of the resilient force of the tightening spring to the winding spring.

In this known seat belt retractor, in a normal condition, only the resilient force of the winding spring is therefore transmitted to the reel. On the contrary, when the automobile body receives shock, "shock" being defined herein as acceleration or deceleration of the automobile exceeding a predetermined value, the lock mechanism releases the tightening spring so that its resilient force is also transmitted to the reel. That is, only the winding spring urges the seat belt to the winding direction in a normal condition, but the tightening spring urges the winding spring so that both springs wind seat belt when shock is applied to the automobile body.

It takes time, however, for this known retractor to wind the seat belt as the winding spring first is wound by the tightening spring, and then the reel is rotated to wind the seat belt. Also, it is necessary for the tightening spring to have a large torque to tighten the winding spring and the reel. Naturally, this means a large tightening spring, which in turn enlarges the retractor.

SUMMARY OF THE INVENTION

An object of this invention is to provide a seat belt retractor which winds the seat belt in a shorter time than conventional retractors and thus improves automobile safety.

Another object of this invention is to provide a seat belt retractor which has a small size.

According to the present invention, there is provided a seat belt retractor comprising means for winding a seat belt, means for storing a rotating force, means for sensing shock applied to the automobile body, a trigger, and a clutch.

The winding means has a reel rotatably supported in a housing and urged in a direction to retract and wind the seat belt.

The storing means has a shaft rotatably supported in a casing, a resilient member urging the shaft in a rotating direction, and a stopper normally preventing the shaft from rotating so that the shaft is held against the resilient member. In other words, under normal conditions, the shaft is kept stationary by means of the stopper to store a predetermined rotating force.

The trigger releases the stopper to allow the shaft to rorate when shock is sensed by the sensing means.

The clutch transmits the rotating force of the shaft to the reel when the shaft rotates due to release by the trigger.

BRIEF DESCRIPTION OF THE DRAWINGS

In the drawings;

FIG. 4(a) is a front view of the state in which the trigger is releasing the stopper;

FIG. 8(a) and FIG. 9(a) illustrate the state in which the trigger locks the stopper;

DESCRIPTION OF THE PREFERRED EMBODIMENTS

Figure 1:
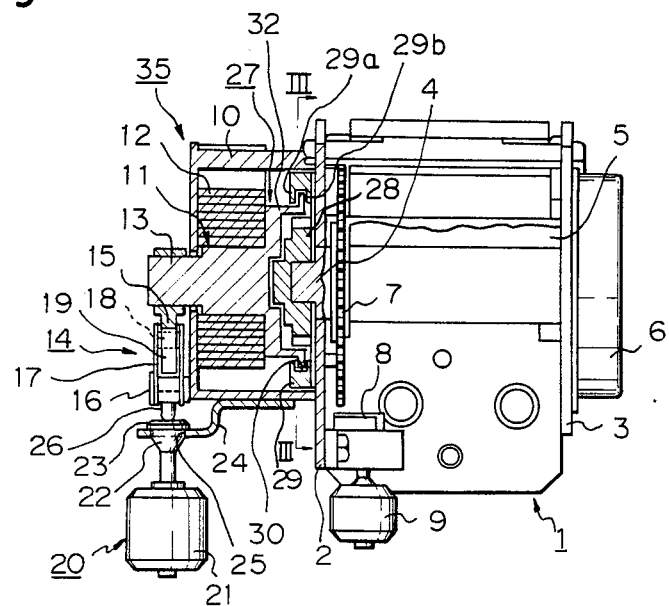
FIG. 1 is a partially sectioned side view of a first embodiment of the present invention.

In FIG. 1 to 4(a), (b), there is shown a seat belt retractor according to a first embodiment of the present invention. A winder 1 has a previously known construction. A reel 4 of this winder 1 is rotatably supported to frames 2, 3 about the axis of the reel 4 and winds a seat belt 5. A spring casing 6 in which a winding spring is housed is provided to the frame 3, the spring urging the reel 4 in the direction in which the seat belt 5 is wound. A gear 7 fixed to the reel 4 is situated near to the frame 2. The outer periphery thereof faces a lock pawl 8 pivotably supported below the frame 2. A pendulum 9 is fixed to the under surface of the lock pawl 8. Therefore, when shock is applied to the automobile body, the pendulum 9 swings so that one end of the pawl 8 is lifted up to engage with the gear 7. In this condition, the reel 4 can rotate only in the direction in which the seat belt 5 is wound (arrow A in FIG. 2) and is prevented from unwinding the seat belt 5.

A storing mechanism 35 is mounted outside of the frame 2. The storing mechanism 35 rotates the reel 4 in the direction indicated by the arrow A when shock is applied to the automobile body. The mechanism 35 rotates the reel 4 independently of the winding spring and is normally separated from the reel 4 by a clutch, described later. In this mechanism 35, a cup-shaped casing 10 is fixed on its open side to the frame 2. A shaft 11 aligned with the axis of the reel 4 is rotatably supported to the casing 10 about the axis of the shaft 11. A tightening spring 12 wound around shaft 11 is given a resilient force in the direction indicated by arrow A by locking the shaft 11 after rotating it in the opposite direction of the arrow A. One end of the spring 12 is fixed to the casing 10.

Figure 2:
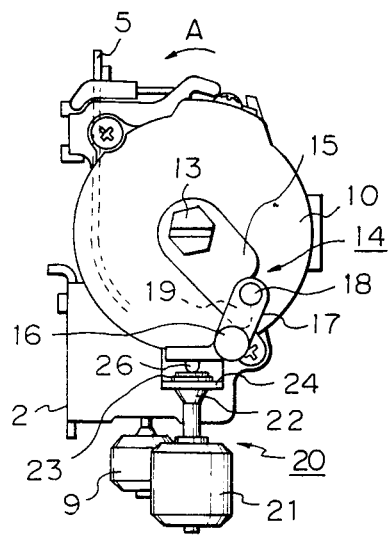
FIG. 2 is a front view of FIG. 1.

One end of the shaft 11 projects from the casing 10. A stopper 14 which locks the tightening spring 12 is provided to the projecting portion 13 of the shaft 11. As shown in FIG. 2, the stopper 14 comprises an arm 15 fitted to the projecting portion 13, which has a hexagonal section; a lock lever 17 pivotably supported to a support member 16, which is fixed to the casing 10; and a pin 18 fixed to this lock lever 17. An end 19 of the arm 15 is formed so as to be more slender than the other portion and engages with the pin 18 in a normal condition. By engagement of the arm 15 with the pin 18, the shaft 11 is locked, whereby the rotation force of the tightening spring 12 in the direction of the arrow A is stored.

Figure 4A:
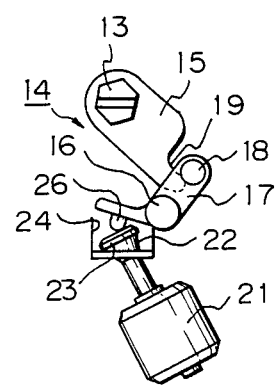
FIG. 4(a), (b) show a stopper and trigger.
Figure 4B:
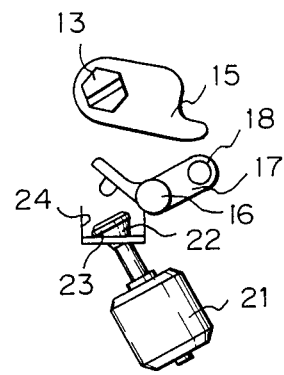
FIG. 4(b) is a front view of a state in which the trigger has released the stopper.
Figure 5:
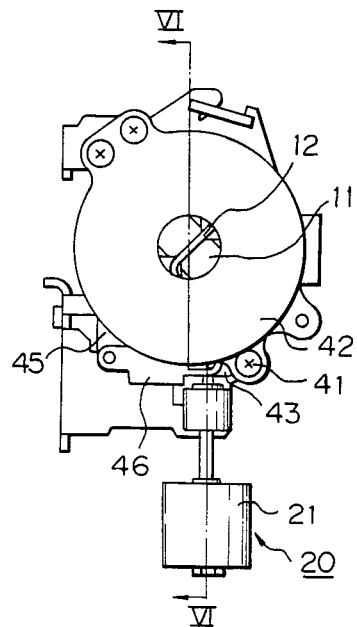
FIG. 5 is a front view of a second embodiment of the present invention.
Figure 6:
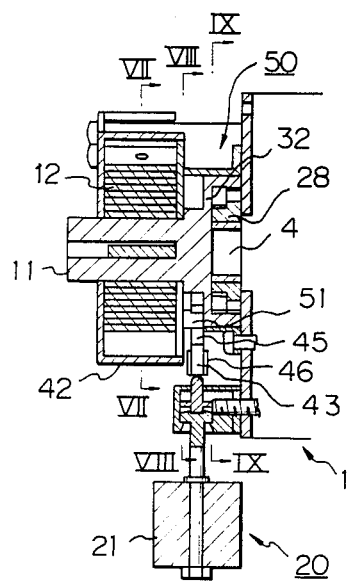
FIG. 6 is a sectional view along line VI—VI of FIG. 5.
Figure 7:
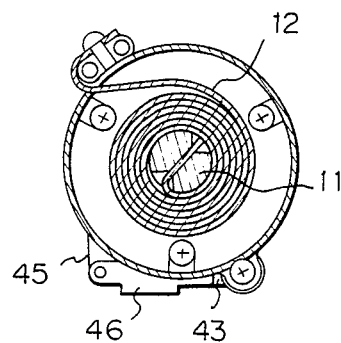
FIG. 7 is a sectional view along line VII—VII of FIG. 6.
Figure 8:
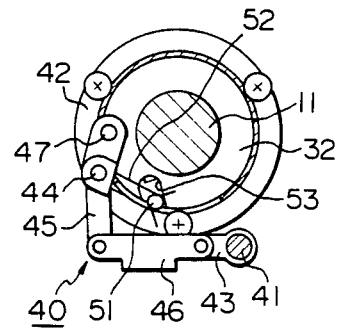
FIG. 8(a), (b), (c) are sectional views along line VIII—VIII of FIG. 6.
FIG. 8(b) and FIG. 9(b) illustrate the state in which the trigger is releasing the stopper.
FIG. 8(c) and FIG. 9(c) illustrate the state in which the trigger has released the stopper.
Figure 9:
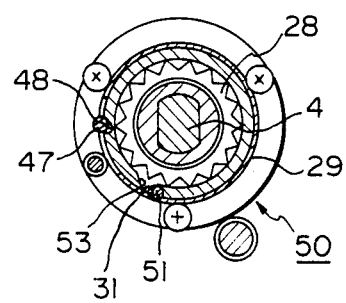
FIG. 9(a), (b), (c) are sectional views along line IX—IX of FIG. 6.
Figure 8:
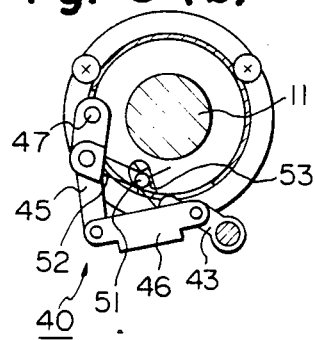
Figure 9:
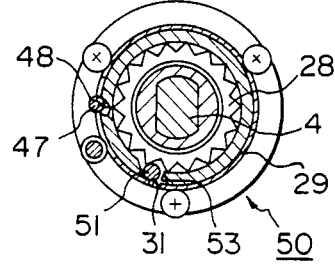
Figure 8:
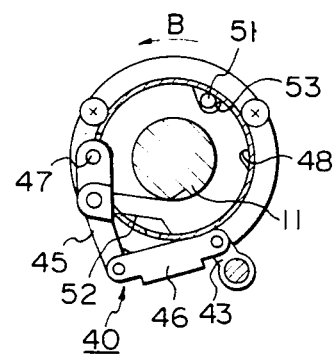
Figure 9:
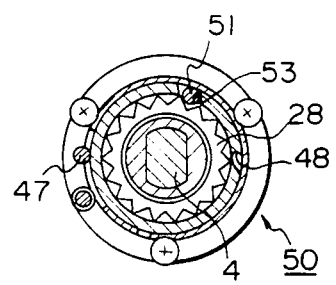

A trigger 20 which releases the locking condition of the stopper 14 is composed of a pendulum 21 made of a heavy material, a rod-shaped support portion 22 extending above the pendulum 21, and a circular rest portion 23 formed on the support portion 22. The support portion 22 is inserted in a hole 25 (FIG. 1) of a bracket 24 mounted under the casing 10, so that the pendulum 21 is swingably supported at the hole 25. The rest portion 23 protrudes upward through the hole 25 and contacts a projecting portion 26 which is formed on an arm of the lock lever 17 extending to the opposite portion provided with the pin 18. Thus, when the automobile is subjected to shock, as shown in FIG. 4(a) and (b), the pendulum 21 swings about the support portion 22. The rest portion 23 thereupon pushes up the projecting portion 26 of the lock lever 17, so that the lever 17 is pivoted and the pin 18 releases the end 19 of the arm 15. As a result, the shaft 11 rotates in the direction of the arrow A due to the resilient force of the tightening spring 12. The shaft 11 makes one revolution at the most.

Normally, the shaft 11 is detached from the reel 4 by a clutch 27, therefore, only the winding spring rotates the reel 4. When shock is applied to the automobile body, the stopper 14 releases the locking condition of the tightening spring 12 as mentioned above, so that the shaft 11 begins to rotate and the clutch 27 connects the shaft 11 to the reel 4, as described below.

Figure 3:
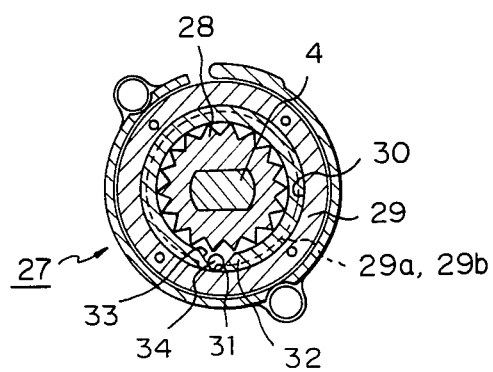
FIG. 3 is a sectional view along line III—III of FIG. 1.

The clutch 27 is provided in the casing 10 and is situated between the tightening spring 12 and the frame 2. As shown in FIG. 3. at the side near the reel 4, the clutch 27 is provided with a gear 28, rigidly fixed to an end of tne reel 4, and an annular guide 29, provided to the frame 2 and enclosing the gear 28. An annular groove 30 is formed on an inner periphery of the guide 29. Rings 29a, 29b projecting at both sides of the groove 30 are provided with a recess 31 directly below the reel 4. At the side near the shaft 11, the clutch 27 is provided with a flange 32 formed on the shaft 11. The periphery of the flange 32 is situated between the gear 28 and the groove 30 and forms a notch 33. A steel ball 34, the diameter of which is larger than the width of the groove 30, continuously engages with the notch 33. The ball 34 can connect the shaft 11 to the reel 4.

In a normal condition, the notch 33 is positioned just beside the recess 31. The steel ball 34 is fitted in the recess 31 and does not contact the gear 28. That is, the reel 4 is separated from the shaft 11 and rotates independently of the resilient force of the tightening spring 12. When shock is applied to the automobile body, the stopper 14 is released, so that the shaft 11 rotates to rotate the flange supporting the ball 34 which is continuously engaged with the notch of the flange 32, and the ball 34 is disconnected from the recess 31 of the guide 29 and engages with the gear 28. When shaft 11 further rotates, the gear 28 rotates with the shaft 11 due to the connection between the gear 28 and the flange 32 thorugh the steel ball 34 and thus the reel 4 and the shaft 11 are rotated as one body.

In the first embodiment of this invention, the operation is as follows: In a normal condition, the arm 15 hooks on the pin 18 of the lock lever 17 as shown in FIG. 2, so that the stopper 14 is in a locking condition, in which a rotational force in the direction of the arrow A is kept in the tightening spring 12. In this condition, the steel ball 34 is disengaged from the gear 28 as shown in FIG. 3, so that the clutch 27 separates the reel 4 and the shaft 11. Therefore, the seat belt 5 is tensioned only by the winding spring of the winder 1.

When deceleration exceeding a predetermined value is applied to the automobile body, the pendulum 21 swings so that the rest portion 23 inclines and pushes up the lock lever 17, the arm 15 being released from the pin 18. As a result, the locking condition of the stopper 14 is released, and the shaft 11 begins to rotate in the direction of arrow A due to the resilient force of the tightening spring 12. Then, the steel ball 34 of the clutch 27 engaging with the notch 33 is released from the recess 31 of the guide 29 to engage with the gear 28. Accordingly, the reel 4 is connected with the shaft 11 and is given the resilient force of the tightening spring 12, so that the reel 4 rotates in the direction of arrow A with a strong rotational force to tighten the seat belt 5. The pendulum 9 also swings, so that the lock pawl 8 inclines to engage with the gear 7. Therefore, the reel 4 is prevented from rotating in the counter direction of the arrow A, so that the tightened seat belt 5 is not unwound.

In FIGS. 5 to 9(a), (b), (c) is shown a second embodiment of the present invention. The construction of the second embodiment is different from that of the first embodiment in the point of the clutch and stopper.

A stopper 40 of the second embodiment has a lever 43 pivotably fixed to a casing 42 by a pin 41, a lock lever 45 pivotably supported to the casing 42 by a pin 44, and a connecting lever 46 which connects the lever 43 and the lock lever 45. The lock lever 45 extends in both directions from the pin 44, one end of the lock lever 45 being connected to the connecting lever 46, another end of the lock lever 45 being provided with a lock pin 47. The lock pin 47 can engage with a notch 48 formed on a flange 32 of the shaft 11. In a normal condition, the lock pin 47 engages with the notch 48 as shown in FIG. 8(a) and FIG. 9(a), so that the lock pin 47 prevents the shaft from rotating to store the resilient force of the tightening spring 12. If the pendulum 21 of the trigger 20 swings in a shock condition, the levers 43, 45, 46 are rotationally displaced as shown in FIGS. 8(b), (c). The lock pin 47 is disengaged from the notch 48, so that the shaft 11 rotates in the direction of the arrow B due to the resilient force of the tightening spring 12.

A clutch 50 has basically the same construction as the clutch 27 of the first embodiment. However, in this clutch 50, the member which connects the reel 4 and the shaft 11 is a pin 51, which engages with a hairpin-shaped spring 52 fixed to the pin 44 in a normal condition. On this point, the clutch 50 of the second embodiment is different from the clutch 27 of the first embodiment. In a normal condition, the pin 51 engages with a notch 53 formed in a flange 32 of the shaft 11, as shown in FIG. 8(a) and FIG. 9(a), and is urged downward by engaging the spring 52. The pin 51 is not moved by external vibration unless the stopper 40 is released. Thus, when shock is applied on the automobile body, the locking condition of the stopper 40 is released, allowing the shaft 11 to rotate and whereby the notch 53 is rotated with the shaft 11. This rotation disengages the pin 51 is therefore disengaged from the recess 31 of the guide 29, thereby releasing the pin 51 from the spring 52 to engage the gear 28 fixed to the reel 4. As a result, the reel 4 is connected to the shaft 11 to rotate in the direction of the arrow B due to urging of the tightening spring 12.

Other functions of this second embodiment are the same as the first embodiment. Therefore, a detailed explanation of the functions is omitted.

The clutches 27, 50 are interchangeable, just as the stoppers 14, 40. Therefore, these may be assembled in any combination.

Further, while, in the above embodiments, the pendulums are used as sensors which sense deceleration, other sensors which operate electrically may be used. That is, the sensors operate a solenoid by electric signals to pivot the lock levers 17, 45.

While embodiments of the present invention have been described with reference to the attached drawings, many modifications and changes may be made by those skilled in this art without departing from the scope of the invention.

We claim:

1. A seat belt retractor mounted on an automobile, comprising:

means for winding a seat belt, said winding means having a reel rotatably supported in a housing and urged in a direction to retract and wind the seat belt;

means for storing a rotating force, said storing means having a shaft rotatably supported in a casing, a resilient member urging said shaft only in a rotating direction, and a stopper normally preventing said shaft from rotating so that said shaft is held against said resilient member, said shaft storing a predetermined rotating force when stopped by means of said stopper;

means for sensing shock applied to the automobile body;

a trigger for releasing said stopper to allow said shaft to rotate when shock is sensed by said sensing means; and a clutch for transmitting said rotating force of said shaft to said reel when said shaft rotates due to release by said trigger, said cultch comprising:

a gear rigidly fixed to said reel;

an annular guide provided at said housing and enclosing said gear, said guide being formed with a recess;

a flange formed at said shaft and provided with a notch; and a connecting member continuously engaging said notch when said shaft does not rotate, said connecting member also engaging said recess formed in said annular guide and being released from said gear so that said reel is detached from said shaft, and when said shaft rotates, said connecting member disengaging from said recess and engaging with said gear so that said reel is connected to said shaft.

2. A seat belt retractor according to claim 1, wherein said resilient member is a tightening spring.

3. A seat belt retractor according to claim 1, wherein said sensing means comprises:

a bracket fixed to said casing and a pendulum swingably supported by said bracket;

said pendulum engaging with said lock lever and, when shock is applied to the automobile body, swinging to push up a portion of said lock lever, so that said lock lever is rotated.

* * * * *